(12) United States Patent
Watanabe et al.

(10) Patent No.: US 10,732,078 B2
(45) Date of Patent: Aug. 4, 2020

(54) INSPECTION SYSTEM AND INSPECTION METHOD

(71) Applicants: KABUSHIKI KAISHA TOSHIBA, Minato-ku (JP); Toshiba Energy Systems & Solutions Corporation, Kawasaki-shi (JP)

(72) Inventors: Manabu Watanabe, Yokohama (JP); Akihiro Matsuzaki, Yokohama (JP); Fumio Sato, Yokohama (JP); Fujio Terai, Yokohama (JP); Hitoshi Katayama, Yokohama (JP); Yuichiro Gunji, Yokohama (JP)

(73) Assignees: KABUSHIKI KAISHA TOSHIBA, Minato-ku (JP); Toshiba Energy Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 16/232,126

(22) Filed: Dec. 26, 2018

(65) Prior Publication Data
US 2019/0195740 A1 Jun. 27, 2019

(30) Foreign Application Priority Data
Dec. 27, 2017 (JP) .................. 2017-251813

(51) Int. Cl.
*G01M 99/00* (2011.01)
*H02K 11/35* (2016.01)
(Continued)

(52) U.S. Cl.
CPC .......... *G01M 99/005* (2013.01); *H02K 11/35* (2016.01); *H02K 15/00* (2013.01); *H02K 5/161* (2013.01);
(Continued)

(58) Field of Classification Search
CPC ...... G01M 99/005; H02K 11/35; H02K 15/00
(Continued)

(56) References Cited

U.S. PATENT DOCUMENTS 4,757,716 A  7/1988 Nottingham et al.
4,970,890 A  11/1990 Jaafar et al.
(Continued)

FOREIGN PATENT DOCUMENTS

CN  204595174 U  8/2015
EP  2 071 343 A1  6/2009
(Continued)

*Primary Examiner* — Nimeshkumar D Patel
*Assistant Examiner* — Jean F Morello
(74) *Attorney, Agent, or Firm* — Oblon, McClelland, Maier & Neustadt, L.L.P.

(57) ABSTRACT

According to an embodiment, an inspection system comprises: a moving body including a moving main body movable along a structure; a detector attached to the moving main body; a shape information storage unit for storing shape information indicating shape and size of the structure; an inspection location information storage unit for storing information of inspection locations to be inspected; an inspection item information storage unit for storing information of inspection items to be inspected; a moving body location detecting unit for detecting moving body location information indicating location of the moving body; a moving control unit for controlling movement of the moving body; and an inspection control unit for inspection.

10 Claims, 10 Drawing Sheets

(51) Int. Cl.
*H02K 15/00* (2006.01)
*H02K 9/08* (2006.01)
*H02K 7/08* (2006.01)
*H02K 7/18* (2006.01)
*H02K 5/16* (2006.01)

(52) U.S. Cl.
CPC .......... *H02K 7/083* (2013.01); *H02K 7/1823* (2013.01); *H02K 9/08* (2013.01)

(58) Field of Classification Search
USPC ...................................................... 73/865.8
See application file for complete search history.

(56) References Cited

U.S. PATENT DOCUMENTS

| | | | |
|---|---|---|---|
| 5,321,362 A | 6/1994 | Fischer et al. | |
| 5,563,357 A * | 10/1996 | Longree | F16L 55/26 73/866.5 |
| 5,650,579 A | 7/1997 | Hatley et al. | |
| 5,969,531 A * | 10/1999 | Murakami | G01R 31/346 324/545 |
| 6,100,711 A * | 8/2000 | Hatley | H02K 15/00 324/765.01 |
| 6,876,222 B2 | 4/2005 | Fischer et al. | |
| 2008/0087112 A1* | 4/2008 | Bagley | G01N 29/265 73/865.8 |
| 2009/0256584 A1* | 10/2009 | Moser | G01R 31/34 324/765.01 |
| 2013/0047748 A1* | 2/2013 | Visintin | G01M 7/00 73/862.381 |
| 2014/0054992 A1 | 2/2014 | Hasegawa et al. | |
| 2015/0276931 A1* | 10/2015 | Airoldi | G01S 7/4808 356/5.01 |
| 2016/0131595 A1* | 5/2016 | Miasnikov | G01N 21/94 |
| 2017/0363688 A1 | 12/2017 | Fischer et al. | |
| 2018/0128879 A1* | 5/2018 | Kuwahara | B25J 5/005 |
| 2019/0022848 A1* | 1/2019 | Akin | G01M 5/0075 |
| 2019/0022849 A1* | 1/2019 | Akin | B25J 5/005 |
| 2019/0022876 A1* | 1/2019 | Akin | B25J 19/023 |
| 2019/0022877 A1* | 1/2019 | Akin | B62D 57/02 |
| 2019/0023334 A1* | 1/2019 | Akin | B62D 57/02 |

FOREIGN PATENT DOCUMENTS

| | | |
|---|---|---|
| GB | 2 263 777 A | 8/1992 |
| TW | 1520466 B | 2/2016 |
| WO | WO 2016/081702 A1 | 5/2016 |
| WO | WO 2016/138529 A1 | 9/2016 |
| WO | WO 2019/018071 A1 | 1/2019 |

* cited by examiner

INSPECTION SYSTEM AND INSPECTION METHOD

CROSS-REFERENCE TO RELATED APPLICATION

This application is based upon and claims the benefit of priority from Japanese Patent Application No. 2017-251813, filed on Dec. 27, 2017; the entire content of which is incorporated herein by reference.

FIELD

The present embodiments relate to an inspection system provided with a moving body movable along a to-be-inspected object, and an inspection method using the inspection system.

BACKGROUND

A rotary electric machine such as an electric power generator requires maintenance including inspection of electrical and mechanical soundness using inspection devices. In such an inspection, the inspection device has to access the outer surface of the rotor or the inner surface of the stator. Typically, the rotor is extracted from the stator for inspection, because the gap between the rotor and the stator is narrow when the rotor is inserted in the stator. However, the extraction of the rotor from the stator requires a lot of labor and time.

Meanwhile, inspection technology is being developed where an inspection device is moved in the narrow annular gap between the rotor and the stator while the rotor remains inserted in the stator.

DETAILED DESCRIPTION

Figure 1:
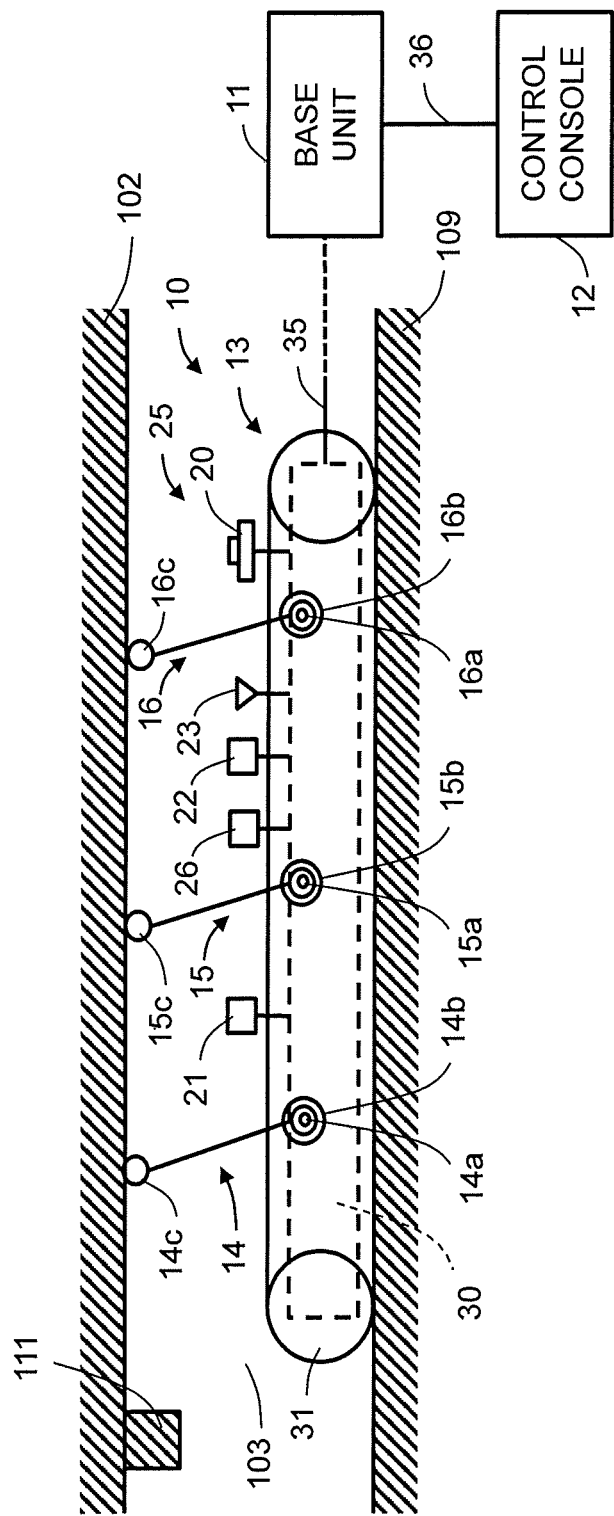
FIG. 1 is a schematic view showing whole structure of an inspection system according to a first embodiment of the invention.

An object of the embodiments is to provide an inspection system and an inspection method where a moving body is moved and inspection of the to-be-inspected object is inspected efficiently with small labor.

According to an aspect of the present invention, there is provided an inspection system comprising: a moving body including a moving main body movable in a gap between a first structure and a second structure facing outside of the first structure; a detector attached to the moving main body, to inspect at least one of the first and second structures; a shape information storage unit for storing shape information indicating shapes and sizes of the first and second structures; an inspection location information storage unit for storing information of inspection location to be inspected, in relation to the shape information; an inspection item information storage unit for storing inspection item information in relation to the inspection location information; a moving body location detecting unit for detecting moving body location information indicating location of the moving body; a moving control unit for controlling movement of the moving body based on the shape information, the inspection location information and the moving body location information; and an inspection control unit for inspection by operating the detector in accordance with the inspection item information, based on the inspection location information, the inspection item information and the moving body location information.

According to another aspect of the present invention, there is provided an inspection method comprising: a moving step of moving a moving body including a moving main body in an axial direction in a gap between a first structure and a second structure facing outside of the first structure; an inspection step of inspecting at least one of the first and second structures by a detector attached to the moving main body; a shape information storing step of storing shape information indicating shapes and sizes of the first and structures; an inspection location information storing step of storing inspection location information in relation to the shape information; an inspection item information storing step of storing inspection item information in relation to the inspection location information; a moving body location detecting step of detecting moving body location information indicating location of the moving body; a moving control step of controlling movement of the moving body based on the shape information, the inspection location information and the moving body location information; and an inspection control step of inspecting by operating the detector in accordance with the inspection item information, based on the inspection location information, the inspection item information and the moving body location information.

Embodiments of the invention are now described referring to drawings. Same or similar parts are assigned common reference numerals, and repetitive explanation is omitted.

First Embodiment

Figure 2:
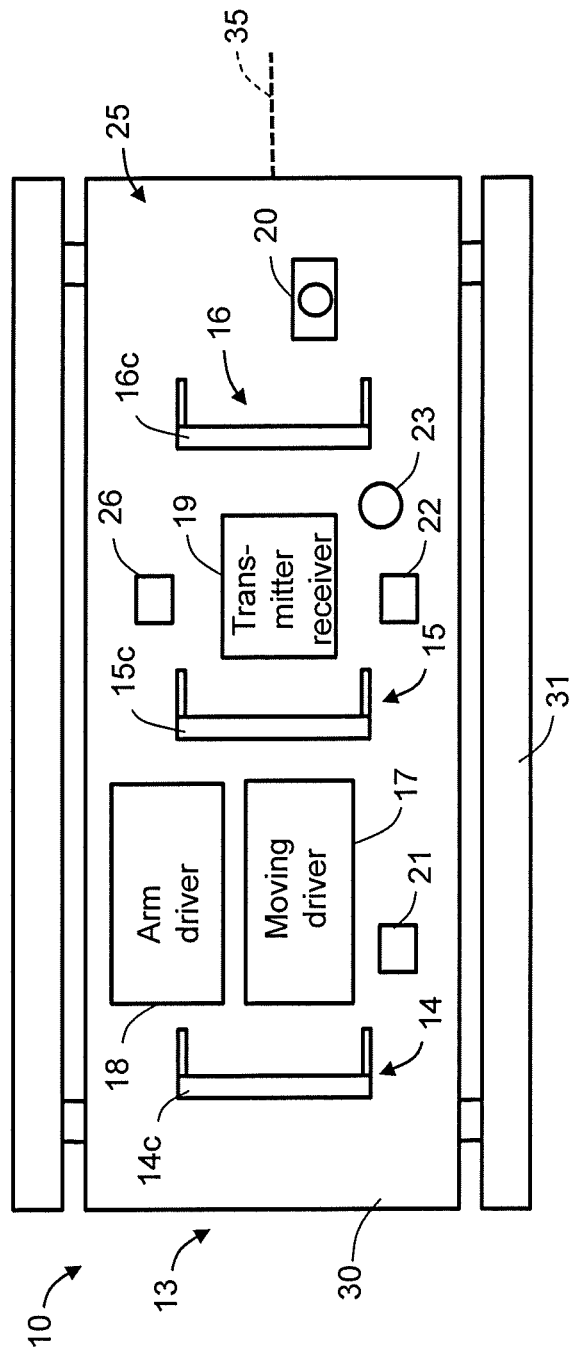
FIG. 2 is a schematic plan view of a moving body shown in FIG. 1.
Figure 3:
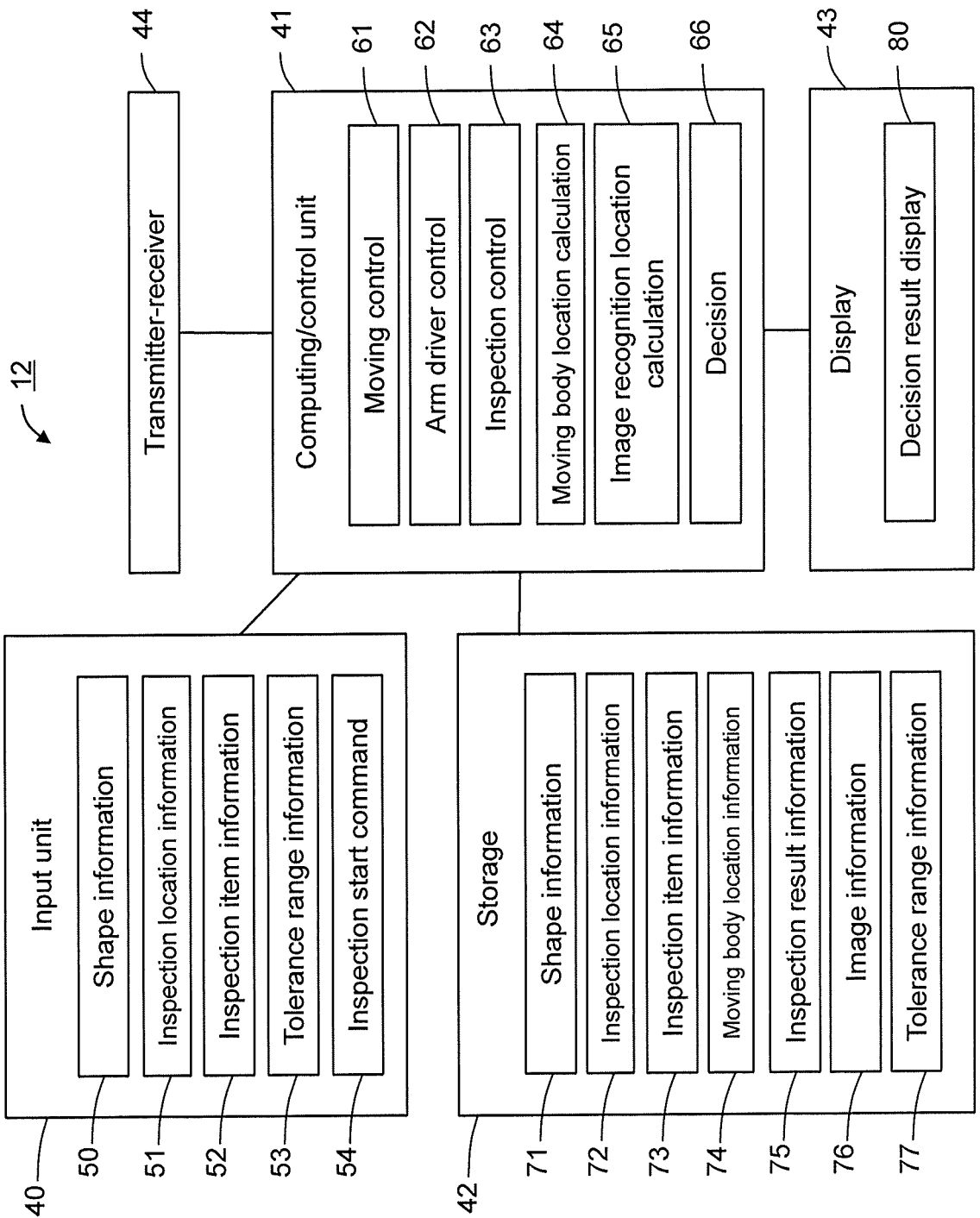
FIG. 3 is a block diagram showing functional structure of a control console shown in FIG. 1.
Figure 4:
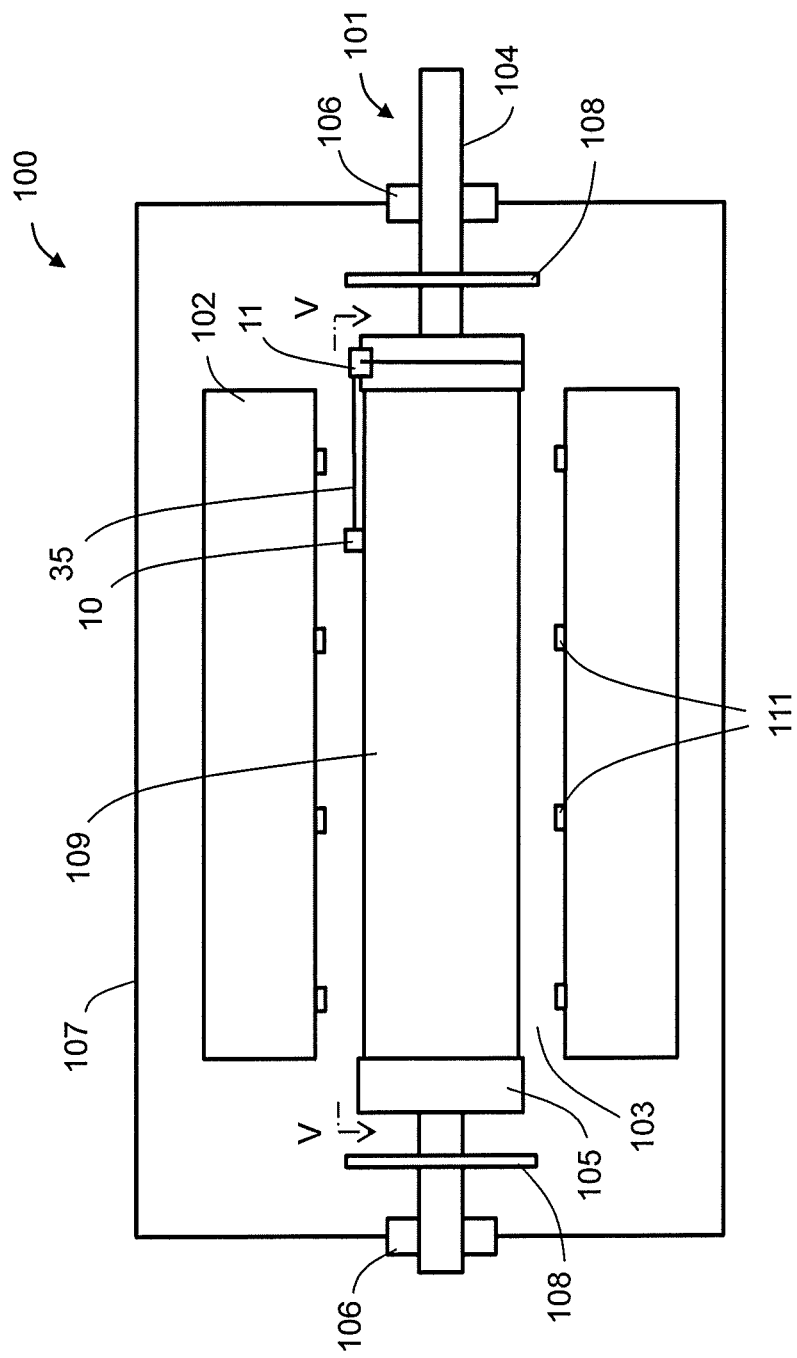
FIG. 4 is a schematic view showing a situation where the moving body and a base unit are located when the inspection system of FIG. 1 is applied to an inspection of a rotary electrical machine.
Figure 5:
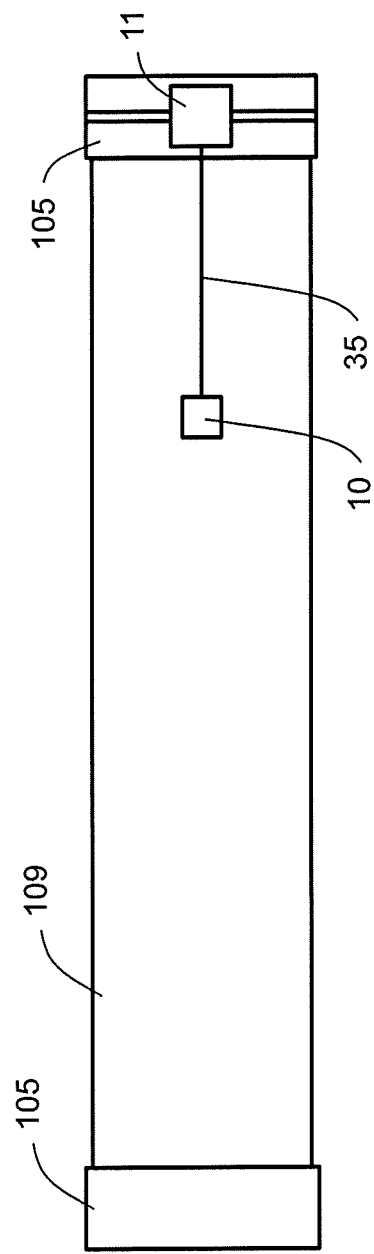
FIG. 5 is a plan view along arrows V-V of FIG. 4.
Figure 6:
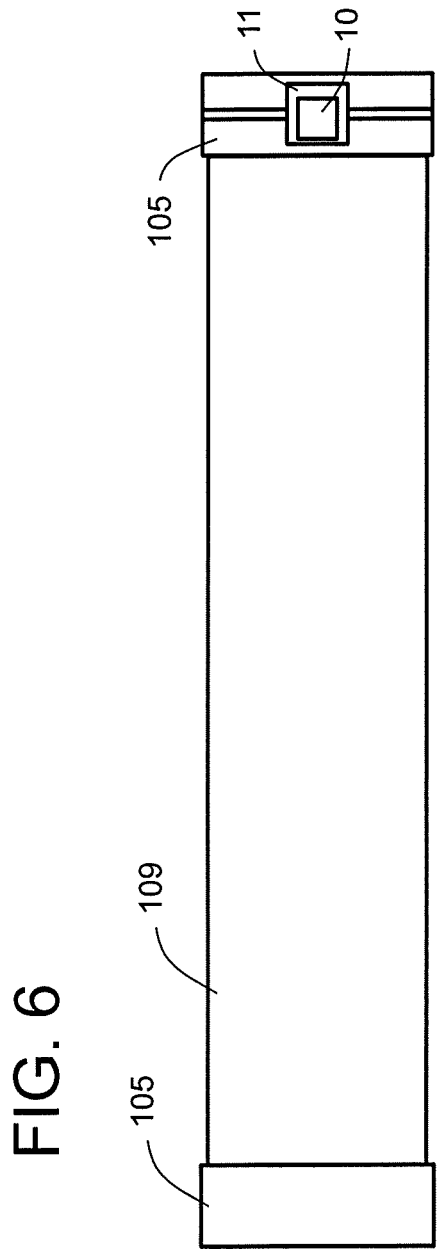
FIG. 6 is a plan view showing a situation where the moving body and the base unit of FIG. 4 are engaged.

FIG. 1 is a schematic view showing whole structure of an inspection system according to a first embodiment of the invention. FIG. 2 is a schematic plan view of a moving body shown in FIG. 1. FIG. 3 is a block diagram showing functional structure of a control console shown in FIG. 1. FIG. 4 is a schematic view showing a situation where the moving body and a base unit are located when the inspection system of FIG. 1 is applied to an inspection of a rotary electrical machine. FIG. 5 is a plan view along arrows V-V of FIG. 4. FIG. 6 is a plan view showing a situation where the moving body and the base unit of FIG. 4 are engaged.

The inspection system according to the first embodiment has: a moving body 10, a base unit 11, a control console 12, a cable 35 connecting the moving body 10 and the base unit 11, and a cable 36 connecting the base unit 11 and the control console 12. The moving body 10 can move in an axial direction on the outer surface of the rotor main body 109 in an annular gap 103. The gap 103 is formed between a rotor main body (first structure) 109 of a rotor 101 of a rotary electrical machine 100 and a stator (second structure) 102 which is disposed outer side of the rotor main body 109 facing the rotor main body 109. The cables 35 and 36 may be connected with relays or may be a continuous cable. In the following explanation, basically, the stator 102, which is the second structure, is the to-be-inspected object. However, the rotor main body 109 which is the first structure may be the to-be-inspected object. The to-be-inspected object may be either one or both of the stator 102 that is the second structure and/or the rotor main body 109 that is the first structure.

The expression of "plan view" is used here only because of convenience for explanation. The structure and the operation do not depend on the direction of gravity. For example, in FIG. 1, the rotor main body 109 is shown to be disposed below the moving body 10, while the stator 102 is shown to be disposed above the moving body 10. However, in practice, such a situation may not be always maintained.

The rotary electrical machine 100 may be, for example, a hydrogen cooling electric power generator. As shown in FIG. 4, the rotor 101 includes: a rotor shaft 104; a rotor main body 109 that is formed in a unit coaxially with the rotor shaft 104 and is provided with rotor windings; and circular end rings 105 that are disposed axially outer sides of the rotor main body 109 sandwiching the rotor main body 109. The rotor shaft 104 constitutes axially outer sides of the rotor main body 109 in the rotor 101. The rotor shaft 104 is provided with bearings 106 to support the rotor 101 as a whole, and a flange to be coupled with an external machine such as a turbine. The outer diameter of the rotor main body 109 is larger than the outer diameter of the rotor shaft 104. The rotor main body 109 includes; a rotor core, rotor windings (not illustrated) disposed in a plurality of axially extending slots formed along the outer peripheral surface of the rotor core; and wedges (not illustrated) to hold the rotor windings in the slots. In many cases, the rotor main body 109 except for the wedges and the rotor windings, and the rotor shaft 104 of the rotor 101 are formed in a unit by forging, for example.

The stator 102 has a hollow circular cylindrical shape, and is disposed surrounding radially outside of the rotor main body 109. Although detail illustration is omitted, the stator 103 has: a stator core formed with a plurality of electromagnetic steel plates stacked in the axial direction; a stator windings disposed in a plurality of slots extending in axial direction formed along the inner surface of the stator core; and wedges to hold the stator windings in the slots.

A frame 107 is disposed to support and cover the stator 102. The bearings 106 are supported by the frame 107. A closed space is formed in the frame 107, and the closed space is filled with cooling medium such as hydrogen gas. A fan 108 is attached to the rotor shaft 104 in the frame 107, by which the cooling medium in the frame 107 is forcefully circulated.

Annular baffles 111 are disposed extending along inner peripheral of the stator 102. The baffles 102 protrude radially inward in the gap 103 from the stator 102 side, and divide the annular gap 103 into a plurality of annular sections arrayed in the axial direction, so that axial flow of the cooling medium in the gap 103 is suppressed. However, the tips of the baffles do not touch the outer surface of the rotor main body 109, and the moving body 10 can pass axially the gap between the tips of the baffles 111 (the inner peripheral surfaces of the baffles 111 facing the rotor 101) and the outer peripheral surface of the rotor main body 109.

The base unit 11 is attached to outer peripheral surface of one of the end rings 105. The base unit 11 can move (rotate) circumferentially on the outer peripheral surface of the end ring 105. The moving body 10 can move axially so that it can be attached to and detached from the base unit 11. When the moving body 10 is attached to the base unit 11 as shown in FIG. 6, the moving body 10 can move (rotate) along the end ring 105 in a peripheral direction.

As shown in FIGS. 1 and 2, the moving body 10 has a moving main body 30, and mounted objects 25 mounted on the moving main body 30. The moving body 10 may be a vehicle, for example.

The moving body 10 can move at least in the direction of the axis of the rotary electrical machine 100. Crawlers 31 are attached to the moving main body (vehicle body) 30. The crawlers 31 are means for moving the moving body 10, pressed to and in contact with the outer peripheral surface of the rotor main body 109 which is the first structure. The crawlers 31 are driven by their wheels which are driven by a moving driver 17. Thus, the moving body 10 can be driven forward, backward and be stopped. The rotation speeds of the right and left crawlers 31 can be adjusted independently by the moving driver 17, so that the forward and backward moving direction of the moving body 10 can be adjusted. Alternatively, the moving means such as wheels can be used instead of the crawlers 31 or tracklayers.

The mounted objects 25 are mounted on the moving main body 30. The mounted objects 25 include a first arm 14, a second arm 15, a third arm 16, the moving driver 17, an arm driver 18, a transmitter-receiver 19, a camera 20, a distance meter 21, a moving distance meter 22, a lighting equipment 23 and a detector 26.

The first, second and third arms 14, 15, 16 are swingable around axes 14a, 15a and 16a, respectively, with respect to the moving main body 30. The arm driver 18 drives the first, second and third arms 14, 15, 16 and changes the shapes such as the positions of the arms with respect to the moving main body 30. The first, second and third arms 14, 15, 16 are driven by the arm driver 18, and can each take a pressed position and a detached position. In the pressed positions, the arms are extended from the moving main body 30 toward the inner peripheral surface of the stator 102. In the detached positions, the arms are folded toward the moving main body 30 and detached from the stator 102.

The arm driver 18 includes a first spring 14b, a second spring 15b, and a third spring 16b which bias the first, second and third arms 14, 15, 16, respectively, in directions of the pressed positions or the detached positions. The arm driver 18 further includes electric motors or air pressure drive mechanisms (not illustrated) to drive the first, second and third arms 14, 15, 16 each toward the pressed position or the detached position against the bias force (restoring force) of the first, second and third springs 14b, 15b and 16b. The arm driver 18 can drive the first, second and third arms 14, 15, 16 each to any one of the pressed position and the detached position.

The first spring 14b and the third spring 16b bias the first arm 14 and the third arm 16, respectively, toward their pressed positions. The second spring 15b biases the second arm 15 toward its detached position. Therefore, if electric power or air pressure source is lost due to an accident or a failure, the first arm 14 and the third arm 16 would take their pressed positions by the first spring 14b and the third spring 16b, respectively, and the second arm 15 would take its detached position by the second spring 15b.

First, second and third rollers 14c, 15c, 16c are attached to leading tips of the first, second and third arms 14, 15, 16, respectively. When the moving body 10 moves while the first, second and third arms 14, 15, 16 are in their pressed positions, the first, second and third rollers 14c, 15c, 16c rotate while they are pressed against the inner surface of the stator 102, so that the moving body 10 can move smoothly.

The first, second and third arms 14, 15, 16 are inclined to a same direction (to the upper left in FIG. 1, for example) with respect to the axial direction. The inclination direction is set so that the positions of the arms can be easily changed when moving main body 30 is pulled in the axial direction with the cable 35. Detailed operation will be explained later referring to FIG. 9.

The distance meter 21 measures the distance to the stator 102. The moving distance meter 22 measures the moved distance of the moving body 10 by measuring the movements of the crawlers 31, for example. The camera 20 obtains image information of the stator 102, for example. The lighting equipment 23 illuminates the shot area of the camera 20 so as to obtain clear image.

The detector 26 detects the rotor main body 109 which is the first structure and/or the stator 102 which is the second structure. The detector 26 may include an ultrasonic flaw detector and/or a camera.

Inspection of the rotor main body 109 may include ultrasonic flaw detection of teeth (not illustrated) each formed between slots containing the rotor windings or of wedges disposed outer side in the slots, using an ultrasonic flaw detector, and/or visual inspection of radial through holes (not illustrated), using a camera.

Inspection of the stator 102 may include wedge loosening inspection where loosening of wedge (not illustrated) is inspected by detecting sound after a hammering of the wedge disposed outer side of the stator windings. Alternatively, the inspection of the stator 102 may include an EL-CID (electromagnetic core imperfection detection) test of the stator core where failure current is detected in a case of a short circuit in the stator core by generating magnetic flux in the stator core.

The detector 26 may not be attached directly to the moving main body 30, but may be attached to the arms 14, 15, 16 described above, especially in a case of inspection of the stator 102, for example. Alternatively, an additional special arm may be attached to the moving main body 30 and the detector may be attached to the additional special arm to inspect the rotor main body 109 and the stator 102. Specifically, the detector 26 for inspecting the stator 102, such as the detector 26 for stator wedge loosening inspection and EL-OD tests of the stator core, is preferably attached to the above described arms 14, 15, 16.

The detector 26 installed on the moving body 30 may include all of the ultrasonic flaw detection devices for the teeth or the wedges of the rotor main body 109, the camera for visual inspection of the vent holes in radial direction of the rotor main body 109, the hammer for inspecting the loosening of the wedges of the stator core and the apparatus for EL-CID tests. Alternatively, some of the detectors described above may be installed on the moving main body 30. Specifically, when the many devices for inspections or tests are installed on the moving main body 30 as the detectors 26, the inspections and tests may be conducted automatically.

The moving driver 17, the arm driver 18, the camera 20, the distance meter 21, the moving distance meter 22 and the detector 26 are controlled or operated by the control console 12, and the obtained data are processed by the control console 12. The information signals are exchanged through the cables 35, 36. All or some of the information signals may be exchanged wirelessly via the transmitter-receiver 19. Alternatively, at least part of the control console 12 including the arm driver controller 62 (described later in detail), for example, may be installed on the moving main body 30 so that the moving body 10 can be controlled and operated autonomously. Furthermore, the control console 12 as a whole may be installed on the moving main body 30.

The control console 12 includes an input unit 40, a computing control unit 41, a storage 42, a display 43 and a transmitter-receiver 44, as illustrated in FIG. 3. The control console 12 may be a multipurpose computer such as a personal computer.

The input unit 40 includes a shape information input unit 50, an inspection location information input unit 51, an inspection item information input unit 52, a tolerance range information input unit 53 and an inspection start command input unit 54.

The shape information input unit 50 is used to input shape information of the shapes of the stator 102 which is the object to be inspected and the second structure, and the rotor main body 109 which is the first structure to support the moving body 10. The shape information is based on the design information or actually measured information of the rotary electric machine 100. When the shape information is obtained by actual measurement, data is obtained using the camera 20 and the distance meter 21, for example, while the moving body 10 is driven manually, and the shape information is obtained from the obtained data.

The inspection location information input unit 51 is used to input inspection location information in relation to the shape information. The inspection item information input unit 52 is used to input the inspection items in relation to the inspection location information. The inspection item information may include information of the area to be inspected. The tolerance range information input unit 53 is used to input tolerance range information that is the basis for deciding the inspection result is acceptable or not.

The inspection start command input unit 54 is used to input the inspection start command.

The computing control unit 41 includes a moving control unit 61, an arm driver control unit 62, an inspection control unit 63, a moving body location calculation unit (a moving body location detection unit) 64, an image recognition location calculation unit 65 and a decision unit 66.

The moving control unit 61 controls the moving driver 17 installed on the moving main body 30 so that the movement of the moving body 10 is controlled. The arm driver control unit 62 controls the arm driver 18 installed on the moving main body 30 so that the movement or operation of the arms 14, 15, 16. The inspection control unit 63 controls the detector 26 etc.

The moving body location calculation unit 64 calculates current location of the moving body 10 based on the history record of the moving body location information, the shape information and the moved (traveled) distance obtained by the moving distance meter 22 installed on the moving main body 30 etc. The image recognition location calculation unit 65 calculates current location of the moving body 10 based on the history record of the moving body location information, the shape information and the image obtained by the camera 20 installed on the moving body 30. In calculation of the current location of the moving body 10, the result of the moving body location calculation unit 64 and the result of the image recognition location calculation unit 65 may be combined to obtain higher preciseness.

The decision unit 66 decides whether the inspection result is acceptable or not based on the tolerance range information.

The storage 42 includes a shape information storage unit 71, an inspection location information storage unit 72, an inspection item information storage unit 73, a moving body location information storage unit 74, an inspection result information storage unit 75, an image information storage unit 76 and a tolerance range information storage unit 77.

The shape information storage unit 71 stores the shape information input with the shape information input unit 50. The inspection location information storage unit 72 stores the inspection location information with the inspection location information input unit 51. The inspection item information storage unit 73 stores the inspection item information with the inspection item information input unit 52. The moving body location information storage unit 74 stores the moving body location information calculated by the moving body location calculation unit 64. The inspection result information storage unit 75 stores the inspection results of the detector 26 etc. and also stores the results of the decision by the decision unit 66. The image information storage unit 76 stores the image obtained by the camera 20 etc. The tolerance range information storage unit 77 stores the tolerance range information input with the tolerance range information input unit 53.

The display 43 includes a decision result display 80. The decision result display 80 displays the decision result of the decision unit 66. The display 43 may include a display unit for displaying the location of the moving body 10 calculated by the moving body location calculation unit 64 and/or the current or present image shot by the camera 20, etc. in addition to the decision result display 80.

The transmitter-receiver 44 of the control console 12 exchange signals with the transmitter-receiver 19 which is included in the mounted objects 25. The signal exchange may be conducted via the cables 35 and 36, or, alternatively, wirelessly.

Figure 7:
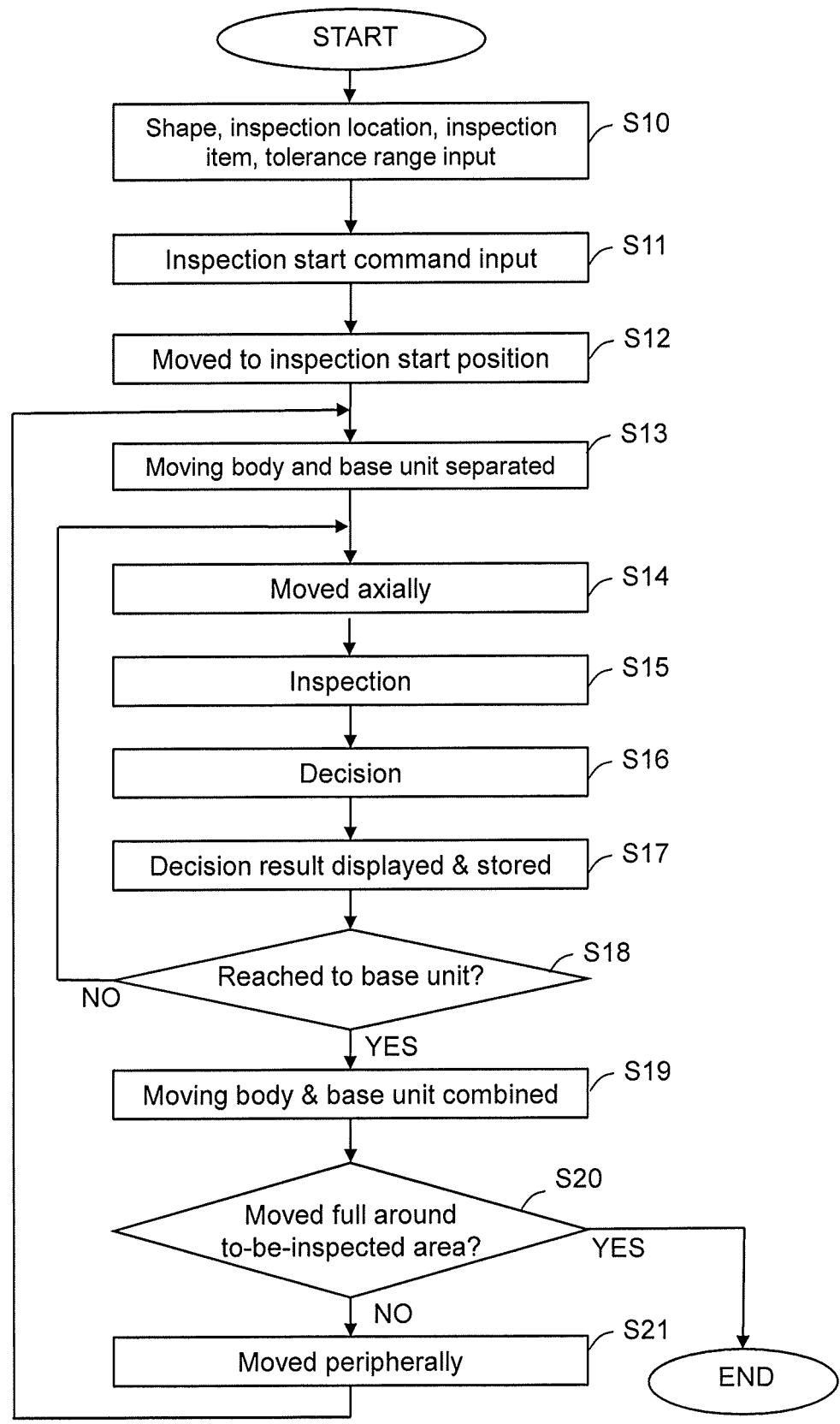
FIG. 7 is a flow chart showing a sequence of an inspection method using the inspection system according to the first embodiment.

FIG. 7 is a flow chart showing a sequence of an inspection method using the inspection system according to the first embodiment. First, the shape information, the inspection location information, the inspection item information and the tolerance range information are input with the shape information input unit 50, the inspection location information input unit 51, the inspection item information input unit 52 and the tolerance range information input unit 53, and they are stored in the shape information storage unit 71, the inspection location information storage unit 72 and the inspection item information storage unit 73, respectively (Step S10). Then, the operator inputs the inspection start command to the inspection start command input unit 54 (Step S11). After that, the inspection system automatically conducts the inspection. In the present embodiment, the object range to be inspected is a whole circumferential surface of the stator 102, for example.

When the inspection start command is input in Step S11, the inspection start location is automatically set based on the inspection item information stored in the inspection item information storage unit 73, and the base unit 11 moves to the peripheral position (inspection start peripheral location) of the slot corresponding to the inspection start location (Step S12). The inspection start location may be set automatically. Alternatively, the inspection start location may be included in the inspection item information input with the inspection item information input unit 52, or may be input in advance when the inspection start command is input in Step S11. When the base unit 11 is moved to the inspection start peripheral location, the moving body 10 and the base unit 11 are separated (Step S13). Then, the moving body 10 moves away axially from the end ring 105 which has been engaged with the moving body 10 via the base unit 11.

Then, the moving body 10 moves axially to the inspection location by the control of the moving control unit 61 and the arm driver control unit 62 (Step S14). After the moving body 10 has reached the inspection location, the inspection is conducted by the control of the inspection control unit 63 (Step S15). Then, the decision unit 66 decides the inspection results (Step S16). The result of the decision is displayed on the decision result display 80, and stored in the inspection result information storage unit 75 (Step S17).

Then, it is decided whether the moving body 10 has reached the base unit 11 (Step S18). If the moving body 10 has not reached the base unit 11 (in a case of NO in Step S18), the procedure returns to Step S14. If the moving body 10 has reached the base unit 11 (in a case of YES in Step S18), the moving body 10 and the base unit 11 are connected (Step S19).

Next to Step S19, it is decided whether the base unit 11 has moved full around the end ring 105 (or all the stipulated area to be inspected has been inspected in a case where the area to be inspected is stipulated in advance in the inspection item information input with the inspection item information input unit 52) (Step S20). If the base unit 11 has moved full around the end ring 105 (or all the stipulated area to be inspected has been inspected in a case where the area to be inspected is stipulated in advance in the inspection item information input with the inspection item information input unit 52) (in a case of YES in Step S20), the operation ends. If the base unit 11 has not moved full around the end ring 105 yet (or all the stipulated area to be inspected has not been inspected yet in a case where the area to be inspected is stipulated in advance in the inspection item information input with the inspection item information input unit 52) (in a case of NO in Step S20), the base unit 11 is moved with the moving body 10 for a stipulated distance in the peripheral direction on the end ring 105 (Step S21). Then, the procedure goes back to Step S13, and the moving body 10 is separated from the base unit 11. Then, the inspection procedure from Step S14 is continued at a different peripheral location apart from the previous peripheral location As described above, the inspection system automatically conducts inspection procedure after the inspection start signal input (Step S11).

In the example shown in FIG. 7, the whole surface of the stator 102 is stipulated in advance as the area to be inspected or the area to be inspected is included in the inspection item information input in advance with the inspection item information input unit 52. Alternatively, when the inspection start command is input in Step S11 of FIG. 7, the area to be inspected may be stipulated in advance, and in Step S20, it may be decided whether all the stipulated area to be inspected has been inspected or not.

In a case where the base unit 11 is attached to only one of the two end rings 105 disposed at both axial ends of the rotor main body 109 as shown in FIG. 4, the moving body 10 goes back on the same axial route to the same base unit 11. Alternatively, base unit 11 may be attached to each of the two end rings 105, although such a situation is not illustrated. In such a situation, the moving body 10 would be engaged with the two base units alternately, and the moving body 10 would move in both axial directions alternately and the inspection is continued without moving on the same axial route repeatedly. Thus, the inspection would be conducted more efficiently.

Next, the operation of the arms of the inspection system according to the first embodiment is described in detail below.

Figure 8:
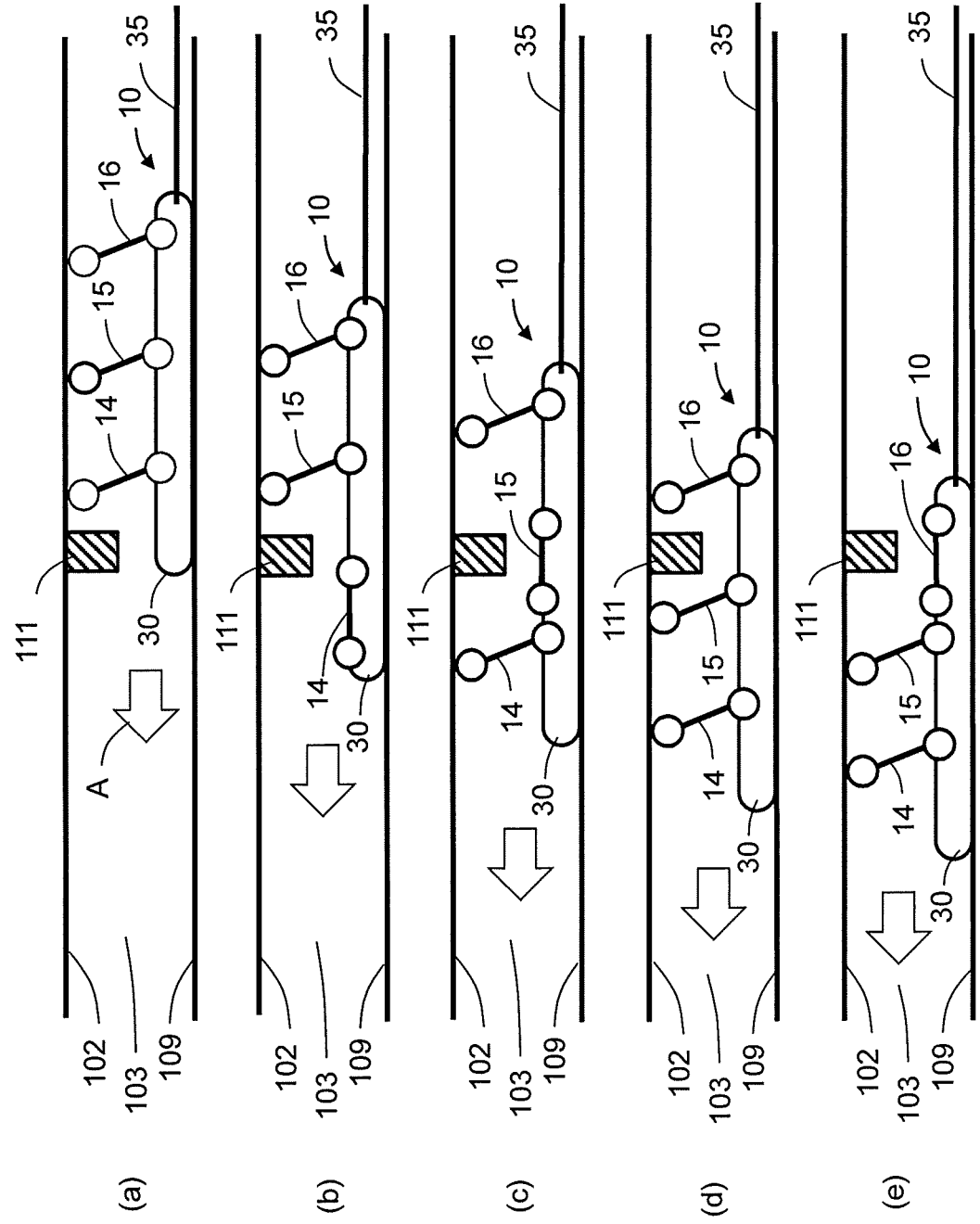
FIG. 8 is an explanatory view showing movements of arms while the moving body of FIG. 1 moves axially on an outer surface of a rotor main body.

FIG. 8 is an explanatory view showing movements of the arms while the moving body 10 of FIG. 1 moves axially on an outer surface of the rotor main body 109. In FIG. 8, the moving body 10 moves in an axial direction (left and right direction in FIG. 8) along the rotor main body (first structure) 109 in the annular gap 103 between the inner peripheral surface of the stator (the object to be inspected; the second structure) 102 and the outer peripheral surface of the rotor main body 109. In the illustrated example, the moving body 10 moves to the left (as shown as an arrow A) as shown in (a), (b), (c), (d) and (e) of FIG. 8 in this order. The circular annulus baffle 111 formed in the inner surface of the stator 102 protrudes toward rotor main body 109.

At the stage of (a) of FIG. 8, the first, second and third arms 14, 15, 16 are all in the pressed positions. The tips of the first, second and third arms 14, 15, 16 press the inner peripheral surface of the stator 102, and the inner peripheral surface of the stator 102 presses the tips of the first, second and third arms 14, 15, 16 as a reaction. Thus, the crawlers 31 of the moving body 10 are pressed to the outer peripheral surface of the rotor main body 109, and the outer peripheral surface of the rotor main body 109 presses the crawlers 31 as a reaction. Thus, the moving body 10 is supported by the stator 102 and the rotor main body 109.

At the stage of (b) of FIG. 8, the second and third arms 15, 16 are in the pressed positions, while the first arm 14 is in the detached position. Thus, interference between the first arm 14 and the baffle 111 can be avoided.

At the stage of (c) of FIG. 8, the first and third arms 14, 16 are in the pressed positions, while the second arm 15 is in the detached position. Thus, interference between the second arm 15 and the baffle 111 can be avoided.

At the stage of (d) of FIG. 8, the first, second and third arms 14, 15, 16 are all in the pressed positions.

At the stage of (e) of FIG. 8, the first and second arms 14, 15 are in the pressed positions, while the third arm 16 is in the detached position. Thus, interference between the third arm 16 and the baffle 111 can be avoided.

With the sequential operation described above, the moving body 10 can pass the inner side of the baffle 111 without interferences between the first, second and third arms 14, 15, 16 and the baffle 111. At the same time, the moving body 10 is supported by the stator 102 and the rotor main body 109, since at least two of the three arms 14, 15, 16 are in the pressed positions.

Next, a situation is explained where the electric power source or the air pressure is lost by an accident or a failure while the moving body 10 is moving axially on the rotor main body 109. In such a situation, the first arm 14 and the third arm 16 become in the pressed positions owing to the restoring forces of the first spring 14b and the third spring 16b, while the second arm 15 becomes in the detached position owing to the restoring force of the second spring 15b. Even in such a situation, the two arms are in the pressed position, and the moving body 10 remains being supported by the stator 102 and the rotor main body 109.

In such a situation, if the moving body 10 cannot move by itself, the moving body 10 can be drawn out of the gap (annular space) 103 by pulling out the cable 35 axially toward the base unit 11.

Figure 9:
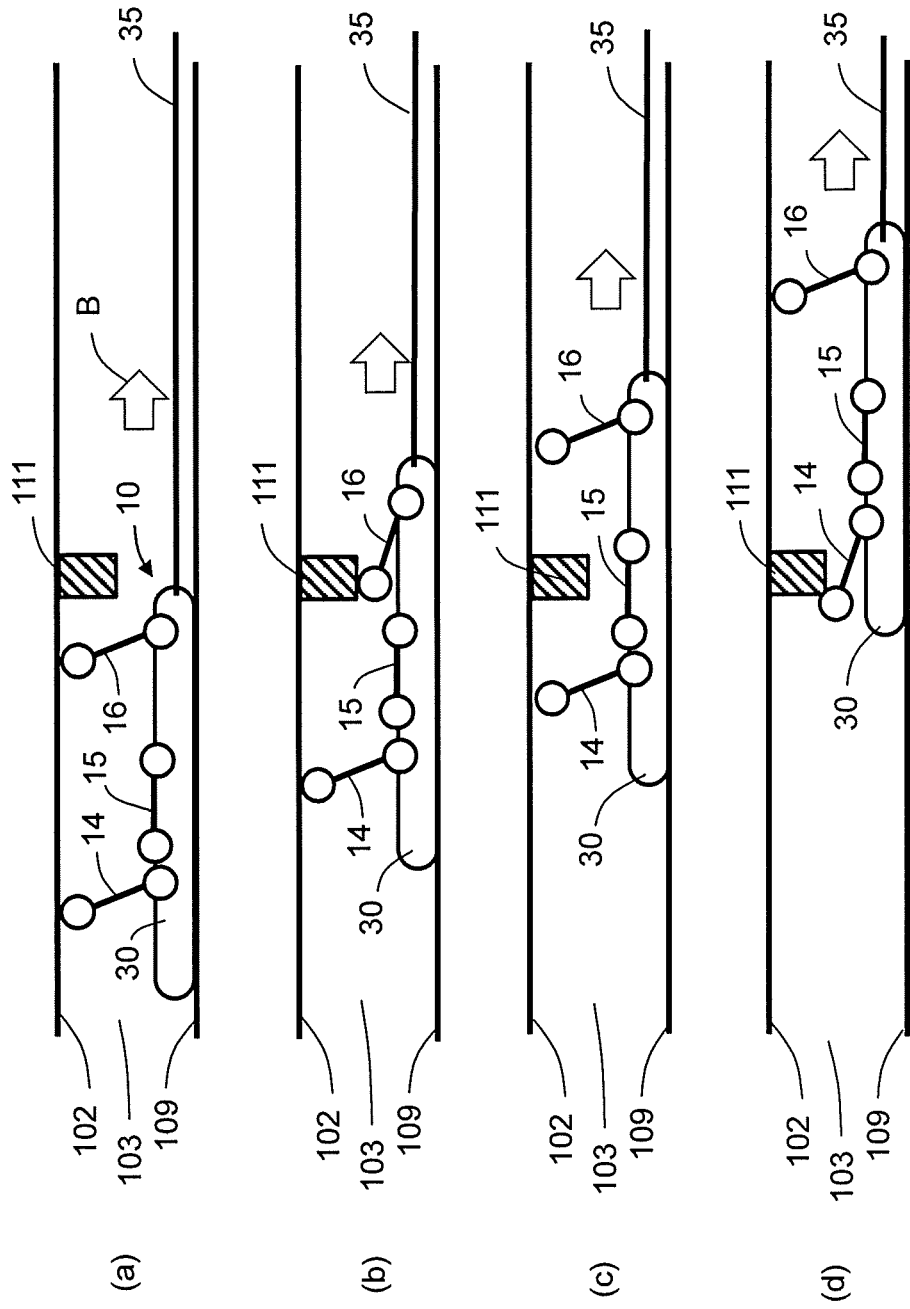
FIG. 9 is an explanatory view showing movements of the arms where the moving body of FIG. 1 is drawn out axially when electric power or air-pressure has been lost during axial movement of the moving body on the outer surface of the rotor main body.

FIG. 9 is an explanatory view showing movements of the arms where the moving body 10 of FIG. 1 is drawn out axially when electric power or air-pressure has been lost during axial movement of the moving body 10 on the outer surface of the rotor main body 109. In the illustrated example, the moving body 10 is drawn and moves to the right (as shown as an arrow B) as shown in (a), (b), (c) and (d) of FIG. 9 in this order.

FIG. 9 (b) shows a situation where the third arm 16 is passing the baffle 111. In this situation, the third arm 16 is in the pressed position owing to the restoring force of the third spring 16b. However, when the roller 16c attached to the tip of the third arm 16 touches the baffle 111, the third arm 16 changes its shape or position against the restoring force of the third spring 16b, and the third arm 16 can pass the baffle 111.

FIG. 9 (c) shows a situation where the third arm 16 has just passed the baffle 111. Since the third arm 16 has passed the baffle 111, the third arm 16 extends to the pressed position by the restoration force of the third spring 16b.

FIG. 9 (d) shows a situation where the first arm 14 is passing the baffle 111. In this situation, the first arm 14 is in the pressed position owing to the restoring force of the first spring 14b. However, when the roller 14c attached to the tip of the first arm 14 touches the baffle 111, the first arm 14 changes its shape or position against the restoring force of the first spring 14b, and the first arm 14 can pass the baffle 111.

As understood from the above description, it is important that the first arm 14 and the third arm 16 are inclined to a same direction. Thus, the first arm 14 and the third arm 16 can change their shape when the moving main body 30 is moved in an axial direction by pulling out the cable 35.

In the above explained example, the moving body 10 is moved by pulling out the cable 35. Alternatively, the moving body 10 may be moved by pulling out a special tow rope or a tow rod (not illustrated) which are different from the cable 35.

As described above, according to the inspection system of the present embodiment, the required information is input through the inspection location information input unit 51, the inspection item information input unit 52 and the tolerance range information input unit 53, and the inspection start command is input through the inspection start command input unit 54. Then, the moving body 10 moves automatically to the inspection location, the required inspection is automatically conducted, and the inspection results are decided automatically whether they are acceptable or not. Thus, reliable and speedy inspection can be conducted with shorter time and smaller labor.

In the above explained example, the arm driver control unit 62 of the control console 12 controls the arm driver 18 installed on the moving main body 30 so that at least two of the three arms are always in the pressed position and remain pushing the stator 102. Alternatively, there may be provided only two arms and at least one of the two arms always remain pushing the stator 102. Such a case may be realized by omitting the second arm 15 in the first embodiment described above.

In such a case, the arm driver 18 installed on the moving main body 30 is controlled by the arm driver control unit 62 of the control console 12 so that at least one of the two arms remain in the pressing position. Thus, the moving body 10 is supported by reactive force of the at least one arm in the pressed position that pushes the stator 102 or the second structure, and by reactive force of the moving body 10 pushing the first structure or the rotor main body 109, in the gap between the rotor main body 109 and the stator 102.

Second Embodiment

Figure 10:
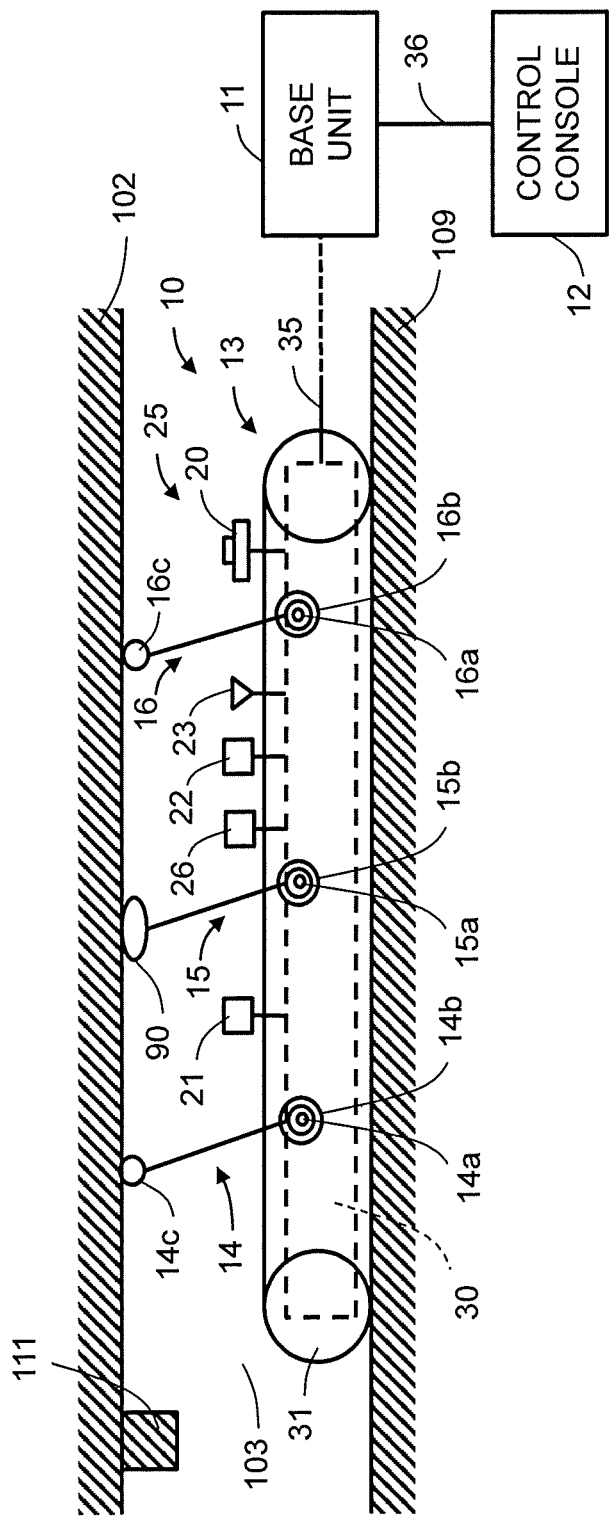
FIG. 10 is a schematic view showing whole structure of an inspection system according to a second embodiment of the invention.

FIG. 10 is a schematic view showing whole structure of an inspection system according to a second embodiment of the invention. The second embodiment is a variant of the first embodiment, and a detector (second detector) 90 instead of the roller is attached to the tip of the second arm 15. In this case, the tip of the second arm 15 may have a function of support of the moving body 10 by pressing the stator 102, or may not have such a support function. In the case where the tip of the second arm 15 is pressed to the stator 102 to support the moving body 10, a roller is preferably attached to the tip of the second arm 15 in addition to the detector 90. In FIG. 10, the second arm 15 is inclined to the same direction as the first and third arms 14, 16 with respect to the direction of the axis of the rotor main body 109. Alternatively, the second arm 15 may be inclined to the opposite direction to the inclination direction of the first and third arms 14, 16.

The detector 90 is preferably for inspection of the stator 102. The detector (the second detector) 90 may include either one or both of sets of inspection devices for inspecting loosening of the wedges (not illustrated) disposed on outer peripheral side of the stator windings, and an EL-CID test apparatus for testing the stator core. The sets of inspection devices for inspecting loosening of the wedges may include a hammer and an acceleration sensor or an acoustic sensor. The loosening of the wedges may be inspected by hitting the wedges with the hammer and detecting the sound with the acceleration sensor or the acoustic sensor. The EL-CID test apparatus may include a magnetic flux forming coil and a fault current detector. The detector 90 may be attached to the tip of the second arm 15.

The detector (the first detector) 26 is attached to the moving main body 30 of the moving body 10 of the inspection system of the second embodiment in a similar way as in the first embodiment. The detector (the first detector) 26 is preferable to inspect the rotor main body 109. An ultrasonic fault detector for inspecting ultrasonic fault detection of teeth between slots of the rotary main body 109, and a camera for visual inspection of the radial vent holes (not illustrated) may be installed on the moving main body 30.

The first arm 14 and the third arm 16 are arranged in this embodiment so that they are inclined in the same direction in respect to the axial direction of the rotary main body 109, in a similar way as in the first embodiment. The first and third rollers 14c, 16c are attached to the tips of the first and third arms 14, 16, respectively. The first spring 14 and the third spring 16b bias the first arm 14 and the third arm 16, respectively, toward the inner peripheral surface of the stator 102 to the pressed state. Thus, when the moving body 10 moves with the first and third arms 14, 16 in the pressed positions, the first and third rollers 14c, 16c are pressed to the peripheral inner surface of the stator 102 and rotate. Thus, if the electric power source or the air pressure is lost, the first arm 14 and the third arm 16 become in the pressed positions owing to the first spring 14b and the third spring 16c, and the moving body 10 is supported there. Especially, in the present embodiment, the first arm 14 and the third arm 16 which are arranged on both ends of the plurality of arms attached to the moving main body 30 become in the pressed position, when the electric power source or the air pressure is lost. Thus, the moving body 10 is securely supported even in the case of power failure or air pressure loss.

The second spring 15b biases the second arm 15 to the detached position. The detector 90 is attached to the tip of the second arm 15. Thus, if the electric power or the air pressure is lost due to an accident or a fault, the second arm 15 takes the pressed position owing to the second spring 15b, and is detached from the inner surface of the stator 102. Then, the detector (the second detector) attached to the tip of the second arm 15 would be contained in the moving main body 30.

In the present embodiment, when the electric power or the air pressure for driving the arms are lost during the axial movement of the moving body 10 on the outer peripheral surface of the rotor main body 109, and when the moving body 10 is drawn out, the first arm 14 and the third arm 16 take the pressed positions owing to the first spring 14b and the third spring 16b, while the second arm 15 to which the detector (the second detector) 90 is attached takes the detached position owing to the second spring 15b, as in the first embodiment. Since the first arm 14 and the third arm 16 are inclined in the same direction with respect to the axial direction of the rotor main body 109, the moving main body 30 can be drawn to move axially with shape changes of the first arm 14 and the third arm 16, as in the first embodiment. In such a situation, the second arm 15 detaches from the inner surface of the stator 102 owing to the second spring 15b, and the detector (the second detector) 90 attached to the tip of the second arm 15 is housed in the moving main body 30, so that the moving body 10 can move without causing any failure or damage of the detector (the second detector) 90 attached to the tip of the second arm 15 which might otherwise hit the stator 102.

OTHER EMBODIMENTS

In the above explanation, the object to be inspected is the second structure that is the stator 102, and the moving body 10 moves along the outer surface of the first structure that is the rotor main body 109. Alternatively, the object to be inspected may be the first structure that is the roto main body 109 and the moving body 10 may move along the inner surface of the second structure that is the stator 102. Furthermore, the object to be inspected may not be a rotary electrical machine.

As a modification of the above explained examples, the mounted objects 25 to be mounted on the moving main body 30 may include a controller (not illustrated), and part of the functions of the control console 12 may be included in the controller in the moving main body 30. The size and weight of the moving body 10 of such a structure may be increased. However, the traffic of the signals exchanged through the cables 35, 36 would be decreased and the speed of the control would be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inspection system comprising:
a moving body including a moving main body movable in a gap between a first structure and a second structure facing outside of the first structure;
first and second movable arms installed on the moving main body;
an arm driver including electric motors or air pressure drive mechanisms for changing a shape of the first and second movable arm based on shape information and moving body location information, so as to move the moving body;
wherein the arm driver includes a spring to bias at least one of the at least two arms in a first direction of the pressed position such that if power of the arm driver is lost, the first or second arm would take the pressed position by the spring;
a detector attached to the moving main body, to inspect at least one of the first and second structures;
a shape information storage unit for storing the shape information indicating shapes and sizes of the first and second structures;
an inspection location information storage unit for storing inspection location information of a plurality of inspection locations to be inspected, in relation to the shape information;
an inspection item information storage unit for storing inspection item information of a plurality of inspection items, each of the inspection items corresponding to each of the inspection locations;
a moving body location detecting unit for detecting the moving body location information indicating location of the moving body;
a moving control unit for controlling movement of the moving body based on the shape information, the inspection location information and the moving body location information; and
an inspection control unit for inspection by operating the detector in accordance with the inspection item information, based on the inspection location information, the inspection item information and the moving body location information.

2. The inspection system according to claim 1, further comprising:
a moving body location information storing unit for storing history of the moving body location information obtained by the moving body location detecting unit, wherein
the moving body location detecting unit includes:
a moving distance meter for measuring moved distance of the moving body, and
a moving body location calculation unit for calculating the moving body location information based on the shape information stored in the shape information storing unit, the history of the moving body location information stored in the moving body location information storing unit and the moved distance measured by the moving distance meter.

3. The inspection system according to claim 1, further comprising:
a distance meter for measuring distance to an object to be inspected by the detector, the distance meter being installed on the moving main body, wherein
the moving control unit is configured to control movement of the moving body based on the distance between the distance meter and the object to be inspected, the distance being measured by the distance meter.

4. The inspection system according to claim 1, further comprising:
a camera for obtaining image including image of an object to be inspected, the camera being installed on the moving main body, wherein
the moving control unit is configured to control the moving body based on the image obtained by the camera.

5. The inspection system according to claim 1, further comprising:
an inspection result information storage unit for storing inspection result of inspection by the inspection control unit;
a tolerance range information storage unit for storing information of pre-set tolerance range about the inspection result; and
a decision unit for deciding whether the inspection result is within the pre-set tolerance range stored in the tolerance range information storage unit.

6. The inspection system according to claim 1, wherein the moving body includes moving unit in contact with the first structure, and is configured to move in the gap while being supported at least partly by the second structure.

7. The inspection system according to claim 1, wherein at least one movable arm is configured to touch with the second structure to be supported by the second structure, while the moving body is moving.

8. The inspection system according to claim 6, wherein
the first and second structures are a rotor main body and a stator of a rotary electrical machine, and
the gap is an annular gap between the rotor main body and the stator.

9. The inspection system according to claim 8, wherein
the first structure is the rotor main body, and the second structure is the stator; and
the inspection system further comprises a base unit to be attached to outer side of the rotor main body, the base unit extending in peripheral direction of the rotor main body, being able to be attached to and detached from the moving body, being able to move the moving body in the peripheral direction when it is attached to the moving body.

10. An inspection method comprising:
a moving step of moving a moving body including a moving main body in an axial direction in a gap between a first structure and a second structure facing outside of the first structure;
the moving body including a moving main body, first and second movable arms installed on the moving main body,
an arm driver including electric motors or air pressure drive mechanisms for changing a shape of the first and second movable arm based on shape information and moving body location information, so as to move the moving body;
wherein the arm driver includes a spring to bias at least one of the at least two arms in a first direction of the pressed position such that if power of the arm driver is lost, the first or second arm would take the pressed position by the spring;
an inspection step of inspecting at least one of the first and second structures by a detector attached to the moving main body;

a shape information storing step of storing the shape information indicating shapes and sizes of the first and second structures;
an inspection location information storing step of storing inspection location information of a plurality of inspection locations in relation to the shape information;
an inspection item information storing step of storing inspection item information of a plurality of inspection items, each of the inspection items corresponding to each of the inspection locations;
a moving body location detecting step of detecting the moving body location information indicating location of the moving body;
a moving control step of controlling movement of the moving body based on the shape information, the inspection location information and the moving body location information; and
an inspection control step of inspecting by operating the detector in accordance with the inspection item information, based on the inspection location information, the inspection item information and the moving body location information.

\* \* \* \* \*